United States Patent
Arata et al.

(10) Patent No.: US 9,163,727 B2
(45) Date of Patent: Oct. 20, 2015

(54) SEALING MEMBER FOR WATER CUTOFF

(71) Applicant: Nishikawa Rubber Co., Ltd., Hiroshima-shi, Hiroshima-ken (JP)

(72) Inventors: Mitsuaki Arata, Hiroshima (JP); Hiroaki Kaneda, Hiroshima (JP); Shinichiro Emori, Hiroshima (JP); Nobukazu Ohnishi, Hiroshima (JP)

(73) Assignee: NISHIKAWA RUBBER CO., LTD., Hiroshima-Shi, Hiroshima-Ken (JP)

( * ) Notice: Subject to any disclaimer, the term of this patent is extended or adjusted under 35 U.S.C. 154(b) by 0 days.

(21) Appl. No.: 14/483,973

(22) Filed: Sep. 11, 2014

(65) Prior Publication Data

US 2015/0084288 A1 Mar. 26, 2015

(30) Foreign Application Priority Data

Sep. 20, 2013 (JP) ................. 2013-195550
Sep. 20, 2013 (JP) ................. 2013-195556
Sep. 20, 2013 (JP) ................. 2013-195561

(51) Int. Cl.
*B60J 5/00* (2006.01)
*F16J 15/02* (2006.01)
*B60J 5/04* (2006.01)

(52) U.S. Cl.
CPC ............ *F16J 15/022* (2013.01); *B60J 5/0418* (2013.01)

(58) Field of Classification Search
CPC ..... B60J 10/0071; B60J 10/081; F16J 15/022
USPC ............................. 49/502; 246/146.1, 146.7
See application file for complete search history.

(56) References Cited

U.S. PATENT DOCUMENTS

| | | | | |
|---|---|---|---|---|
| 5,456,513 | A * | 10/1995 | Schmidt | 296/39.1 |
| 6,059,882 | A * | 5/2000 | Steinhardt et al. | 118/264 |
| 6,126,228 | A * | 10/2000 | Davis et al. | 296/146.7 |
| 6,422,640 | B2 * | 7/2002 | Whitehead et al. | 296/146.7 |
| 6,767,049 | B1 * | 7/2004 | Morrison et al. | 296/146.7 |
| 6,966,594 | B2 * | 11/2005 | Wojewnik | 296/39.3 |
| 6,997,505 | B2 * | 2/2006 | Dry et al. | 296/146.7 |
| 7,036,868 | B2 * | 5/2006 | Kohara et al. | 296/146.7 |
| 7,044,533 | B2 * | 5/2006 | Dry et al. | 296/146.5 |
| 7,350,848 | B2 * | 4/2008 | Miyahara et al. | 296/146.7 |
| 7,670,671 | B2 * | 3/2010 | Russell et al. | 428/172 |
| 7,784,851 | B2 * | 8/2010 | Filipczak et al. | 296/146.1 |
| 8,507,075 | B2 * | 8/2013 | Filipczak et al. | 428/194 |
| 2001/0030444 | A1 * | 10/2001 | Whitehead et al. | 296/146.7 |
| 2002/0011711 | A1 * | 1/2002 | Senda et al. | 277/626 |
| 2003/0001408 | A1 * | 1/2003 | Hockenberry et al. | 296/146.7 |

(Continued)

FOREIGN PATENT DOCUMENTS

JP  3890568 B2  3/2007
JP  2009-195834 A  9/2009

*Primary Examiner* — Jerry Redman
(74) *Attorney, Agent, or Firm* — Carter, DeLuca, Farrell & Schmidt, LLP; Robert P. Michal, Esq.

(57) ABSTRACT

A sealing member for water cutoff is stuck to a door inner panel of an automobile for joining a door hole seal. The sealing member for water cutoff is long in length and at least a part thereof is curved when used. The sealing member for water cutoff comprises: a body part made of vulcanized sponge rubber, which is extrusion molded and having softness and elastic restoring force for reverting to an original shape when an external force once applied is unloaded; and adhesive layers formed by applying adhesive on surfaces of the body part.

15 Claims, 11 Drawing Sheets

(56) References Cited

U.S. PATENT DOCUMENTS

| | | | |
|---|---|---|---|
| 2005/0248181 A1* | 11/2005 | Bigelow | 296/146.7 |
| 2006/0017306 A1* | 1/2006 | Smith et al. | 296/146.7 |
| 2006/0043765 A1* | 3/2006 | Radu et al. | 296/146.7 |
| 2006/0178485 A1* | 8/2006 | Shimakage et al. | 525/242 |
| 2007/0238835 A1* | 10/2007 | Chen | 525/240 |
| 2014/0088214 A1* | 3/2014 | Okamoto et al. | 521/140 |
| 2014/0308884 A1* | 10/2014 | Janssen et al. | 451/529 |

* cited by examiner

SEALING MEMBER FOR WATER CUTOFF

CROSS REFERENCE TO RELATED APPLICATION

This application claims the benefit under 35 USC §119 of JP Patent Applications JP 2013-195550 filed Sep. 20, 2013, 2013-195556 filed Sep. 20, 2013 and 2013-195561 filed Sep. 20, 2013, the entire disclosure of each of which is incorporated herein by reference.

BACKGROUND INFORMATION

The present invention relates to sealing members for water cutoff and sealing methods making use of the sealing members for water cutoff. The sealing members for water cutoff are used, for example, for joining door hole seals (door hole covers) for covering up openings, or water or noise insulation sheets to inner cabin sides of door inner panels of automobiles.

As shown in FIG. 14, there has been disclosed a structure that a door hole seal (door hole cover) 2 or a water or noise insulation sheet is joined to an inner cabin side of a door inner panel 1 of an automobile door 40 by a sealing member 10 for water cutoff. The door hole seal 2 is made of polyethylene and is used for covering up an opening 50. The opening 50 is formed on the door inner panel 1 and used as a hole for mechanical operation. See, for example, Japanese examined Patent Publication No. 3890568 and Japanese unexamined Patent Publication No. 2009-195834.

Examples of the sealing member 10 for water cutoff include butyl sealant 11 made of soft rubber material which is sticky and wet and which has an indeterminate form, shown in FIG. 15. The door hole seal 2 is installed on the door inner panel 1 by: annularly installing the butyl sealant 11 along a concave 1a for positioning on the door inner panel 1; and piling an outer peripheral end of the door hole seal 2 on the butyl sealant 11.

Japanese examined Patent Publication No. 3890568 discloses that the water or noise insulation sheets are installed on the door inner panels by transparent films on the outer peripheral ends of the sheets, and the transparent films are joined to the door inner panels by sealer (glue).

Japanese unexamined Patent Publication No. 2009-195834 discloses that ribbon-like adhesive is applied to release paper, the adhesive on release paper is pressed against ends of the door hole covers or peripheries of openings for transferring the adhesive from the release paper, and then the door hole covers are installed on the door inner panels.

Examples of the adhesive include: rubber-based, acrylic or olefinic hot melt glue; and butyl rubber-based hot melt glue.

It is to be noted that the inner panels of Japanese examined Patent Publication No. 3890568 and Japanese unexamined Patent Publication No. 2009-195834 do not have concaves for positioning the glue.

These structures simplify installation of the door hole seals (door hole covers) or the water or noise insulation sheets on the door inner panels, enable the door hole seals or the like thus installed to cover the openings on the door inner panels and achieve excellent water or noise insulation effects.

Unfortunately, however, the butyl sealant 11 of FIG. 15, which is sticky and wet and which has the indeterminate form requires adept skill for operators. Specifically, the operators have to stick the butyl sealant 11 on the door inner panel 1 by expanding the butyl sealant 11. In addition, the butyl sealant 11 requires a large number of steps for installation. Also, the butyl sealant 11 once pasted on the door inner panel 1 is hard to peel and, even in case the butyl sealant 11 is somehow peeled, a part of the butyl sealant 11 remains on a side of the door panel 1 or on a side of the door hole seal 2, which makes it impossible to paste the same butyl sealant 11 again. The structure is not capable of adjusting positional shift, which requires completion of the installation on a first try. Further, the butyl sealant 11 may erroneously stain the operators. In hot seasons including summer, the butyl sealant 11 softens and is hard to stably install. Also, the structure requires formation of the extra concave 1a for positioning the butyl sealant 11 on the door inner panel 1.

The sealer and the hot melt glue of Japanese examined Patent Publication No. 3890568 and Japanese unexamined Patent Publication No. 2009-195834, once pasted on the side of the door inner panel or on the side of the door hole seal are hard to peel and it is impossible to paste the sealer and the hot melt glue again after peeled.

There have been strong demands for controlling the sealing members for water cutoff as the wholes to remain on one of the sides of door inner panels and the sides of the door hole seals in order to improve operation efficiency in case the door hole seals once installed on the door inner panels are peeled off the door inner panels.

Therefore, an object of the present invention is to provide the sealing members for water cutoff which, once pasted, can be easily peeled and pasted again in the same manner as a beginning.

Another object of the present invention is to provide the sealing methods making use of the sealing members for water cutoff which as the wholes remain on one desired sides of two members in case the two members joined to each other via the sealing members for water cutoff are peeled.

SUMMARY

In order to achieve the above-mentioned object, according to one aspect of the invention, a sealing member (20) for water cutoff is provided, the sealing member (20) for water cutoff being stuck to a panel (1) or a body for an automobile for joining a member (2) to the panel (1) or the body for the automobile, the sealing member (20) for water cutoff being long in length and at least a part of the sealing member (20) for water cutoff being curved when used, wherein the sealing member for water cutoff comprises a body part (21) and adhesive layers (22), the body part (21) being made of rubber which is extruded and vulcanized, the body part (21) having softness and elastic restoring force for reverting to an original shape when an external force once applied is unloaded and the adhesive layers (22) being formed by applying adhesive on surfaces of the body part (21).

In addition, according to an aspect of the present invention, said adhesive layer (22B) on the surface on a side of the member (2) of said body part (21) and said adhesive layer (22A) on the surface on a side of the panel (1) or the body for the automobile of said body part (21) have difference in adhesiveness.

In addition, according to an aspect of the present invention, the difference in the adhesiveness is secured by differentiating adhesion areas of said adhesive layers (22A, 22B) in a width direction.

In addition, according to an aspect of the present invention, the difference in the adhesiveness is secured by differentiating coating thickness of said adhesive layers (22A, 22B).

In addition, according to an aspect of the present invention, the difference in the adhesiveness is secured by differentiating adhesion areas of altered cross sectional shapes on said side of the member (2) and on said side of the panel (1) or the body for the automobile of said body part (21).

In addition, according to an aspect of the present invention, at least one (22A) of said adhesive layers (22A, 22B) has a thick part (22Aa) and a thin part (22Ab) in the coating thickness provided by turns in the width direction.

In addition, according to an aspect of the present invention, one or a plurality of concave (23) on a surface on the side of the panel (1) or the body for the automobile of the body part (21) has a whole of or a part of adhesive for the side of the panel (1) or the body for the automobile filled therein; when sticking and joining said member (2) to the side of said panel (1) or the body for the automobile, said one or the plurality of concave (23) is pushed open and adhesive (22S) inside strongly adheres in part to a surface of the panel (1) or the body for the automobile; substantially a whole surface on the side of said member (2) has adhesive for the side of said member (2) applied thereon; and adhesiveness of said adhesive layer (22B) on the surface on the side of said member (2) is stronger than adhesiveness of said adhesive layer (22A) on the surface on the side of the panel (1) or the body for the automobile of said body part (21).

In addition, according to an aspect of the present invention, said member (2) is a sheet; the adhesive layer (22B) on the surface on the side of said sheet of said body part (21) comprises a thick part (22Ba) and a thin part (22Bb) in coating thickness provided by turns in a width direction; and said sheet is curved into a corrugated shape in accordance with the thick part (22Ba) and the thin part (22Bb) of the adhesive layer (22B) for said thin part (22Bb) as well as said thick part (22Ba) to be adhered to the sheet.

In addition, according to an aspect of the present invention, said body part (21) is made of a material having a specific gravity of 0.01 to 1.5, a tensile fracture strength of 0.5 to 30 N and an elongation of 150 to 1000%.

In addition, according to an aspect of the present invention, said body part (21) is made of a material having a specific gravity of 0.1 to 0.3, a tensile fracture strength of 3 to 10 N and an elongation of 200 to 800%.

In addition, according to an aspect of the present invention, said body part is made of a sponge body.

In addition, according to an aspect of the present invention, said body part (21) is made of EPDM.

In addition, according to an aspect of the present invention, said adhesive is aqueous acrylic.

In addition, according to an aspect of the present invention, a sealing method making use of the sealing member (20) for water cutoff of the present invention is provided, wherein: the adhesiveness of said adhesive layer (22B) on the surface on the side of said member (2) of said body part (21) is stronger than the adhesiveness of said adhesive layer (22A) on the surface on the side of the panel (1) or the body for the automobile of said body part (21); and when peeling said member (2) which is stuck and joined to said panel (1) or the body for the automobile, said sealing member (20) for water cutoff peels on the side of said panel (1) or the body for the automobile thereof.

In addition, according to an aspect of the present invention, a sealing method making use of the sealing member (20) for water cutoff of the present invention is provided, wherein: adhesiveness of said adhesive layer (22B) on the surface on the side of said member (2) of said body part (21) is weaker than adhesiveness of said adhesive layer (22A) on the surface on the side of the panel (1) or the body for the automobile of said body part (21); and when peeling said member (2) which is stuck and joined to said panel (1) or the body for the automobile, said sealing member (20) for water cutoff peels on the side of said member (2) thereof.

In addition, according to an aspect of the present invention, a sealing method making use of the sealing member (20) for water cutoff of the present invention is provided, wherein: when peeling said member (2) which is stuck and joined to said panel (1) or the body for the automobile, said sealing member (20) for water cutoff peels on the side of said panel (1) or the body for the automobile thereof.

Symbols in parentheses show constituents or items corresponding to the drawings.

According to the sealing member for water cutoff of the present invention, the sealing member for water cutoff is long in length and is prepared by forming the adhesive layers on the surfaces of the body part. The body part is made of vulcanized rubber and having the softness and the elastic restoring force for reverting to the original shape when the external force once applied is unloaded. The sealing member for water cutoff is stuck to the panel or the body for the automobile for joining the member to the panel or the body for the automobile. Accordingly, the sealing member for water cutoff once peeled can be pasted once again or many times again.

The structure remarkably improves installation operability and enables inexperienced operators to stick and install the members including door hole seals to the panel or the body for the automobile.

The structure prevents problems of the sealing member 10 for water cutoff of the prior art that the butyl sealant 11 stains the operators and that, in hot seasons including summer, butyl sealant 11 softens and is hard to install stably. Also, the structure does not necessitate a concave 11a on the door inner panel 1 for positioning the butyl sealant 11.

In addition, the adhesive layer on the surface to be pasted on the panel or the body for the automobile and the adhesive layer on the surface to be pasted on the member have difference in adhesiveness. According to the structure, when peeling the member off the panel or the body for the automobile after the member is installed on the panel or the body for the automobile, the sealing member for water cutoff as a whole is controlled to remain on the panel or the body for the automobile or on the member.

In other words, in case the adhesiveness of the adhesive layer on the surface on the side of the member of the body part is stronger than the adhesiveness of the adhesive layer on the surface on the side of the panel or the body for the automobile of the body part, by peeling the member which is stuck and joined to the panel or the body for the automobile, the sealing member for water cutoff is controlled to peel on the side of the panel or the body for the automobile thereof. On the other hand, in case the adhesiveness of the adhesive layer on the surface on the side of the member of the body part is weaker than the adhesiveness of the adhesive layer on the surface on the side of the panel or the body for the automobile of the body part, by peeling the member which is stuck and joined to the panel or the body for the automobile, the sealing member for water cutoff is controlled to peel on the side of the member thereof.

According to the structure, when joining the door hole seal as the member to the door inner panel by the sealing member for water cutoff, in case the adhesiveness of the adhesive layer on the surface on the side of the door hole seal of the body part is stronger than the adhesiveness of the adhesive layer on the surface on the side of the door inner panel, by peeling the door hole seal which is stuck and joined to the door inner panel, the sealing member for water cutoff as the whole tidily peels always on the side of the door inner panel. The door hole seal with the sealing member for water cutoff remarkably improves operability of joining the door hole seal again. Also, since the body part is made of the vulcanized rubber having the softness and the elastic restoring force, the sealing member for water cutoff once peeled can revert to the original shape before adhered. Accordingly, confirmation or operation inside the door hole can be carried out even after the door hole seal is installed.

In addition, the door hole seal made of polyethylene with the sealing member for water cutoff can be conveyed by: annularly pasting the surface on one side (lower surface, for example) of the sealing member for water cutoff to an outer peripheral end of an upper surface of the door hole seal; and piling the door hole seal with the sealing member for water cutoff for a plurality of times. According to the structure, the surface on another side (upper surface, for example) of the sealing member for water cutoff sticks to another door hole seal, and then protects the adhesive surface. This situation is preferable. In addition, the difference in the adhesiveness enables the sealing member for water cutoff to peel off the above-mentioned another door hole seal and to revert to a same condition as a beginning (original condition) at the time of installation after the conveyance. Accordingly, piling and conveying the door hole seals with the sealing members for water cutoff does not degrade resultant products.

In addition, the one or the plurality of concave on the surface on the side of the panel or the body for the automobile of the body part has the whole of or the part of the adhesive for the side of the panel or the body for the automobile filled therein. When sticking and joining the member to the side of the panel or the body for the automobile, the one or the plurality of concave of the body part excellent in softness deforms to be pushed open.

The adhesive inside the concave comes out and partly adheres to the surface of the panel or the body for the automobile more strongly than other part of the panel or the body for the automobile around the concave. Accordingly, amount of the adhesive to be filled in the one or the plurality of concave can be simply adjusted and, as a result, the adhesiveness of the sealing member for water cutoff relative to the panel or the body for the automobile can be simply adjusted.

It is to be noted that "the whole of the adhesive for the side of the panel or the body for the automobile" means that the adhesive for the side of the panel or the body for the automobile is entirely filled in the one or the plurality of concave. Also, "the part" means that there is remaining adhesive for the side of the panel or the body for the automobile, which is applied on the surface of the panel or the body for the automobile other than the part facing the concave.

BRIEF DESCRIPTION OF THE DRAWINGS

FIG. 1(a) and FIG. 1(b) are I-I line enlarged cross sections of FIG. 14, showing a sealing member for water cutoff of a first embodiment of the present invention, in which FIG. 1(a) shows a state before a door hole seal is installed on a door inner panel and FIG. 1(b) shows a state after the door hole seal is installed on the door inner panel;

FIG. 4(a) and FIG. 4(b) are I-I line enlarged cross sections of FIG. 14, showing a sealing member for water cutoff of a second embodiment of the present invention, in which FIG. 4(a) shows a state before a door hole seal is installed on a door inner panel and FIG. 4(b) shows a state after the door hole seal is installed on the door inner panel;

FIG. 5(a) and FIG. 5(b) are I-I line enlarged cross sections of FIG. 14, showing processes of peeling the door hole seal installed on the door inner panel by the sealing member for water cutoff of the second embodiment of the present invention, in which FIG. 5(a) shows a state just before the door hole seal is peeled and FIG. 5(b) shows a state that the door hole seal is being peeled;

FIG. 10(a), FIG. 10(b) and FIG. 10(c) are I-I line enlarged cross sections of FIG. 14, showing a sealing member for water cutoff of a third embodiment of the present invention, in which FIG. 10(a) shows a state that adhesive is applied on a body part, FIG. 10(b) shows a state before a door hole seal is installed on a door inner panel and FIG. 10(c) shows a state after the door hole seal is installed on the door inner panel;

FIG. 11(a) and FIG. 11(b) are I-I line enlarged cross sections of FIG. 14, showing processes of peeling the door hole seal installed on the door inner panel by the sealing member for water cutoff of the third embodiment of the present invention, in which FIG. 11(a) shows a state just before the door hole seal is peeled and FIG. 11(b) shows a state that the door hole seal is being peeled;

FIG. 12(a), FIG. 12(b) and FIG. 12(c) are I-I line enlarged cross sections of FIG. 14, showing other sealing members for water cutoff of the third embodiment of the present invention, in which FIG. 12(a) shows a state that adhesive is applied on a body part, FIG. 12(b) shows a state before a door hole seal is installed on a door inner panel and FIG. 12(c) shows a state after the door hole seal is installed on the door inner panel;

DESCRIPTION OF PREFERRED EMBODIMENT (First Embodiment)

Figure 1A:
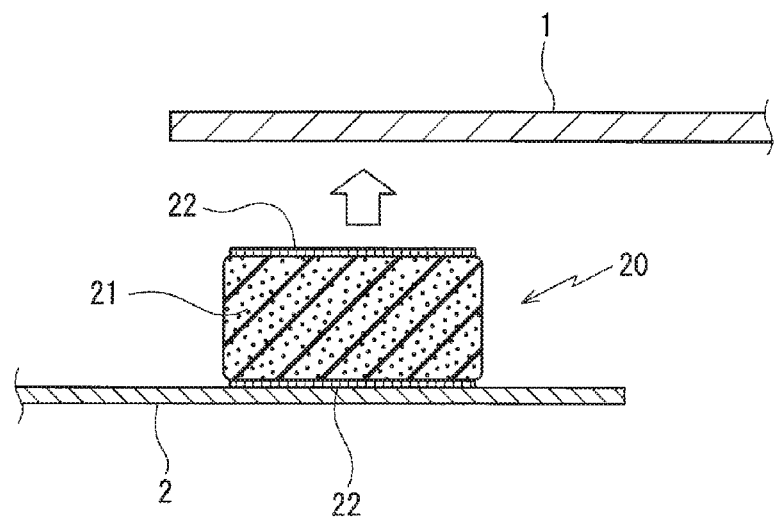
Figure 1B:
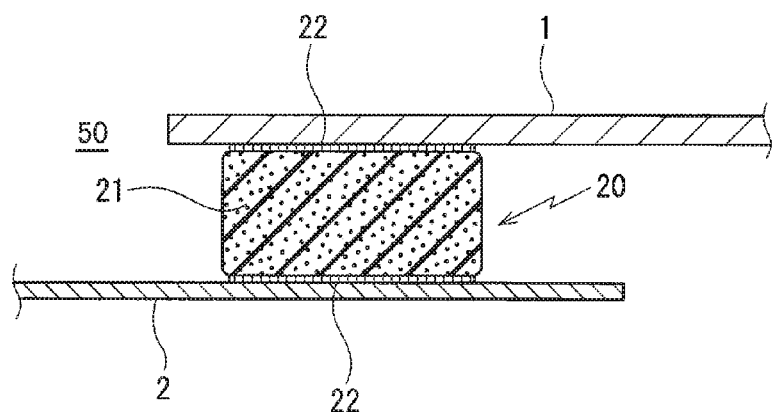
Figure 14:
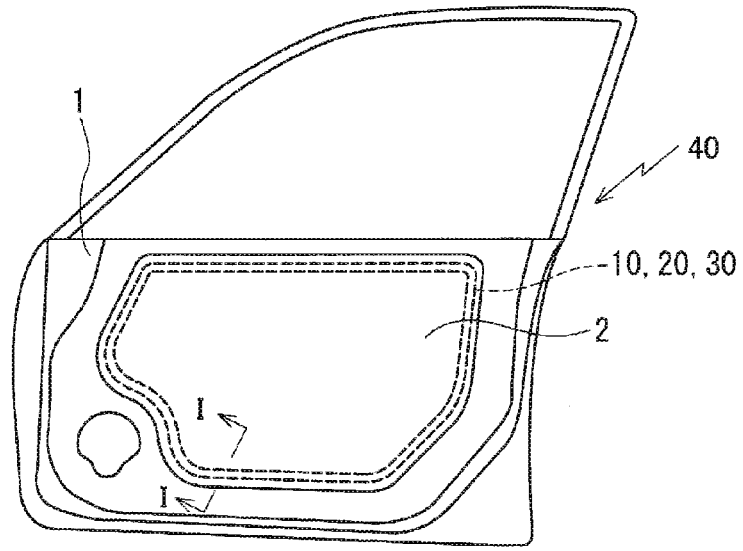
FIG. 14 is a side view of an inner-cabin side of an automobile door.

Referring to FIG. 1 and FIG. 14, a sealing member 20 for water cutoff of a first embodiment of the present invention will be described.

The sealing member 20 for water cutoff of the first embodiment of the present invention is stuck to a panel or a body for an automobile for joining a member to the panel or the body for the automobile, the sealing member for water cutoff is long in length and at least a part of the sealing member for water cutoff is curved when used. The present embodiment specifies an example shown in FIG. 14 that a door inner panel 1 has a door hole seal 2 installed thereon. The door hole seal 2 covers up an opening 50, which is used for mechanical operation on the door inner panel 1, from an inner cabin side.

The sealing member 20 for water cutoff comprises a body part 21 made of vulcanized rubber and adhesive layers 22 formed by applying adhesive on surfaces of the body part 21.

The body part 21 is substantially rectangular in cross section and is extrusion molded. The body part 21 has the adhesive layers 22 formed on one surface (upper surface) and another surface (lower surface) as long sides thereof.

The body part 21 is made of a material which has softness and elastic restoring force for reverting to an original shape when an external force once applied is unloaded. Rubber materials usable as the body part 21 include sponge bodies with many bubbles and solid bodies without bubbles.

More specifically, the rubber materials usable as the body part 21 include the material having a specific gravity of 0.01 to 1.5, a tensile fracture strength of 0.5 to 30 N and an elongation of 150 to 1000%. The rubber material preferably is a sponge-like body having specific gravity of 0.1 to 0.3, tensile fracture strength of 3 to 10 N and elongation of 200 to 800%. The tensile fracture strength not more than 3 N may cause fracture of the material while peeling the material. The elongation not more than 200% results in inferior follow up property (an R follow up property) when curved, and the elongation not less than 800% results in difficulty in handling. The specific gravity less than 0.1 results in rupture of base materials and the specific gravity more than 0.3 results in difficulty in the R follow up property.

The body part 21 is preferably made of vulcanized rubber which is synthetic rubber such as EPDM sponge. The body part 21 which is extruded as well as vulcanized is more preferable. Since the EPDM sponge which is extruded and vulcanized comprises a skin layer (thin surface layer without bubbles) on a surface, adhesive hardly permeates the bubbles forming the sponge and is applied on the surface of the skin layer. In case the body part 21 is made from unvulcanized sponge rubber, the resultant body part 21 may deform for heat, can not revert to an original shape as the sealing member 20 for water cutoff of the first embodiment or can not be pasted again after peeled. Accordingly, the body part 21 made of unvulcanized sponge rubber is not preferable.

There are a variety of methods of forming the adhesive layers 22 on the body part 21, including coating the surface of the body part 21 with the adhesive by brushes, rolls or extrusion nozzles (nozzles with shapes suitable for forming the adhesive layers 22), and spraying the adhesive on the surfaces of the body part 21. The method is not especially limited.

Figure 2:
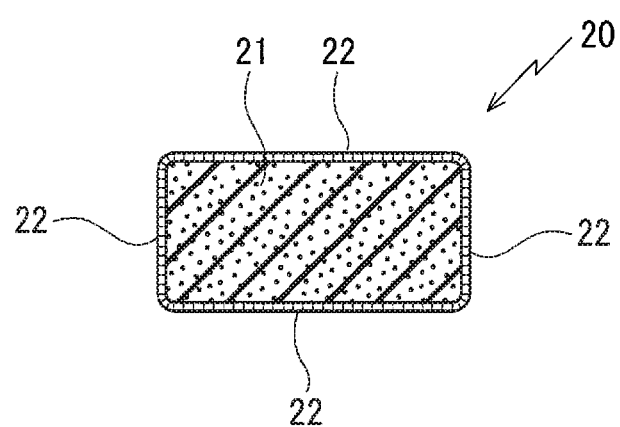
FIG. 2 is a cross section showing a process of preparing the sealing member for water cutoff of the first embodiment of the present invention.

In the present embodiment, the adhesive layers 22 are formed by: molding a rope-like body part 21 by extrusion and vulcanization; dipping the rope-like body part 21 into an adhesive tank (not shown) filled with liquid adhesive for forming the adhesive layer 22 on a whole circumference of the body part 21 as shown in FIG. 2; passing the body part 21 through a die for scraping (not shown) for removing the adhesive layers 22 on left and right side surfaces of the body part 21; air drying the adhesive layers 22 remaining on the body part 21; and sandwiching an upper surface and a lower surface of the body part 21 with release paper. The adhesive layers 22 on left and right side surfaces of the body part 21 may be left without being removed.

Optionally adjusting film thickness of the adhesive layers 22 simplifies pasting and peeling the sealing member 20 for water cutoff off the door inner panel 1 and the door hole seal 2.

The adhesive may be any material compatible with EPDM rubber, door inner panel 1 and the door hole seal 2 and is not especially limited. Examples of the adhesive include aqueous adhesive which is acrylic. The aqueous adhesive which is acrylic is generally used. While aqueous adhesive is preferred in consideration of environmental pollution, the adhesive is not necessarily aqueous.

The door hole seal 2 is a polyethylene (PE) sheet. Surface treatment is applied on an adhesive surface of the door hole seal 2 with the sealing member 20 for water cutoff for improving adhesion force. Examples of the surface treatment include corona discharge treatment, plasma discharge treatment and coating primer. The present embodiment employs corona discharge treatment.

A method of installing the door hole seal 2 making use of the sealing member 20 for water cutoff comprises: peeling the release paper off the lower surface of the sealing member 20 for water cutoff; and pressing the lower surface of the sealing member 20 for water cutoff against a whole circumference of an outer peripheral end of the upper surface of the door hole seal 2, on which the surface treatment is applied by corona discharge treatment, for pasting the sealing member 20 for water cutoff to the door hole seal 2.

When pasting the sealing member 20 for water cutoff on corner parts or the like of the door hole seal 2, the sealing member 20 for water cutoff has to be stretched and curved. The sealing member 20 for water cutoff is excellent in the follow up property against curves so that the adhesive layers 22 do not break off even in case the sealing member 20 for water cutoff is stretched. The structure enables to stably paste the sealing member 20 for water cutoff on the side of the door hole seal 2 while securing sealing property. The structure also enables the sealing member 20 for water cutoff to follow various curves and winds in upper, lower, left and right directions and steep convex and concave shapes of the surface, on which the sealing member 20 for water cutoff is pasted.

Figure 3:
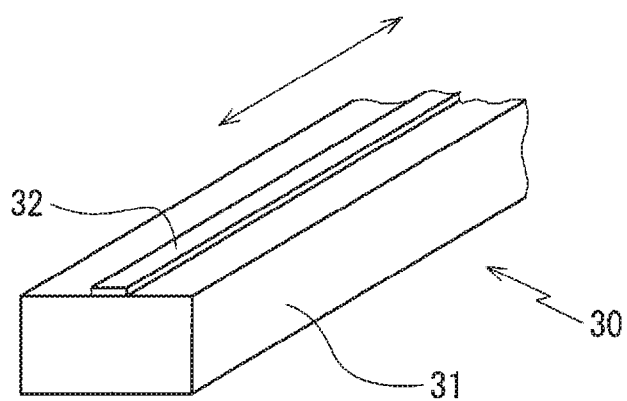
FIG. 3 is a perspective view of the sealing member for water cutoff having double sided tape stuck thereon.

It is to be noted that a sealing member 30 for water cutoff shown in FIG. 3 having double sided tape 32 stuck thereon instead of the adhesive layers 22 may be used. More specifically, the sealing member 30 for water cutoff is formed by sticking the double sided tape 32 made of paper on surfaces of a body part 31. The body part 31 is made of synthetic rubber including EPDM rubber in the same manner as the body part 21 of the sealing member 20 for water cutoff. But when stretching and curving the sealing member 30 for water cutoff, the double sided tape 32 on the sealing member 30 for water cutoff can not stretch and may break off. The structure does not ensure sufficient sealing property.

In case the sealing member 20 for water cutoff is installed on a position shifted from a desired position on the door hole seal 2, the sealing member 20 for water cutoff may be partly peeled off the door hole seal 2 and pasted again on a correct position, or the sealing member 20 for water cutoff as a whole may be peeled off the door hole seal 2 and pasted again on the correct position.

The body part 21 of the sealing member 20 has softness and elastic restoring force for reverting to an original shape when an external force once applied is unloaded. Also, the adhesive layers 22 follow expansion and contraction of the body part 21. Accordingly, the sealing member 20 for water cutoff once peeled off the door hole seal 2 can keep a shape and can be pasted once again or many times again in the same manner as a beginning.

The method of installing the door hole seal 2 making use of the sealing member 20 for water cutoff further comprises: peeling the release paper off the upper surface of the sealing member 20 for water cutoff which is pasted on the door hole seal 2; and joining the door hole seal 2 with the sealing member 20 for water cutoff to a fixed position of the door inner panel 1 for covering up an opening 50 from an inner cabin side.

When pasting the sealing member 20 for water cutoff to the door inner panel 1, the sealing member 20 for water cutoff once peeled off the door inner panel 1 can keep the shape and can be pasted once again or many times again in the same manner as the beginning. Accordingly, positional shift which arises while pasting the sealing member 20 for water cutoff on the door inner panel 1 can be simply modified.

In the present embodiment, the lower surface of the sealing member 20 for water cutoff is pasted on the door hole seal 2 first and the upper surface is pasted on the side of the door inner panel 1 secondly. But the door hole seal 2 may be pasted on the sealing member 20 for water cutoff which is pasted on the side of the door inner panel 1 beforehand.

Since the sealing member 20 for water cutoff can be pasted once again or many times again in the same manner as the beginning, the sealing member 20 for water cutoff remarkably improves operability for maintenance of doors and enables even inexperienced operators to easily install the door hole seal 2.

Figure 15:
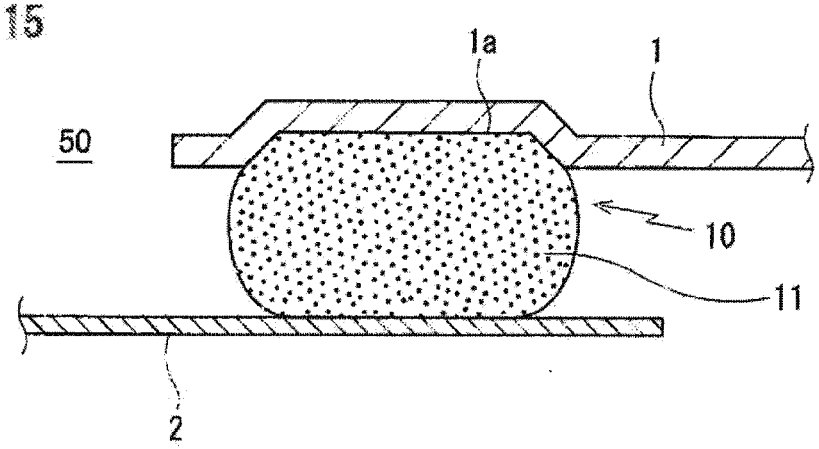
FIG. 15 is a I-I line enlarged cross section of FIG. 14, showing a sealing member for water cutoff of a prior art after a door hole seal is installed on a door inner panel.

The structure prevents problems of the sealing member 10 for water cutoff of the prior art shown in FIG. 15 that butyl sealant 11 erroneously stain the operators and cannot be removed, and that in hot seasons including summer, the butyl sealant 11 softens and is hard to install stably. Also, the structure does not require formation of an extra concave 11a for positioning the butyl sealant 11 on the door panel 1. In addition, the structure prevents remains on the surface after a pasted member is peeled.

(Second Embodiment)

Figure 4A:
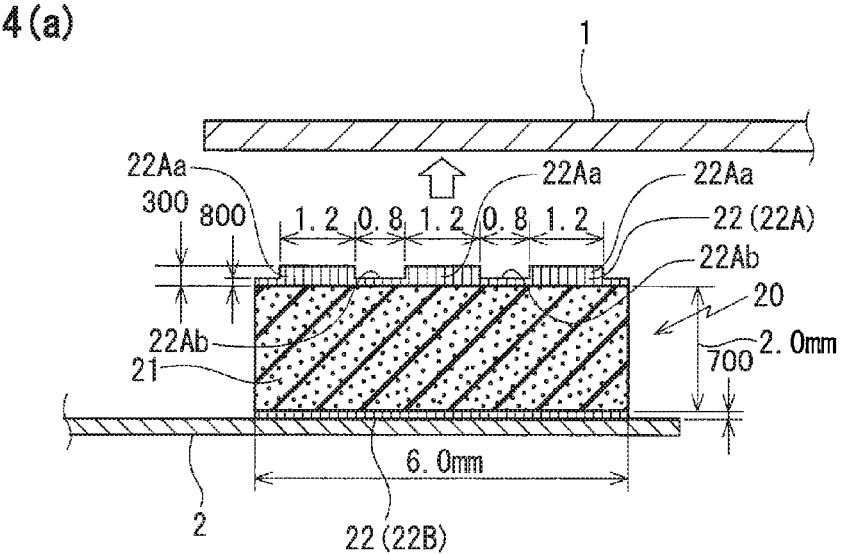
Figure 4B:
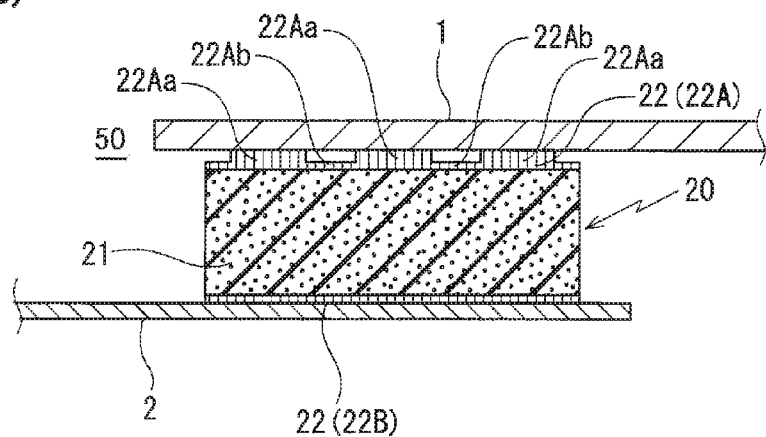
Figure 5A:
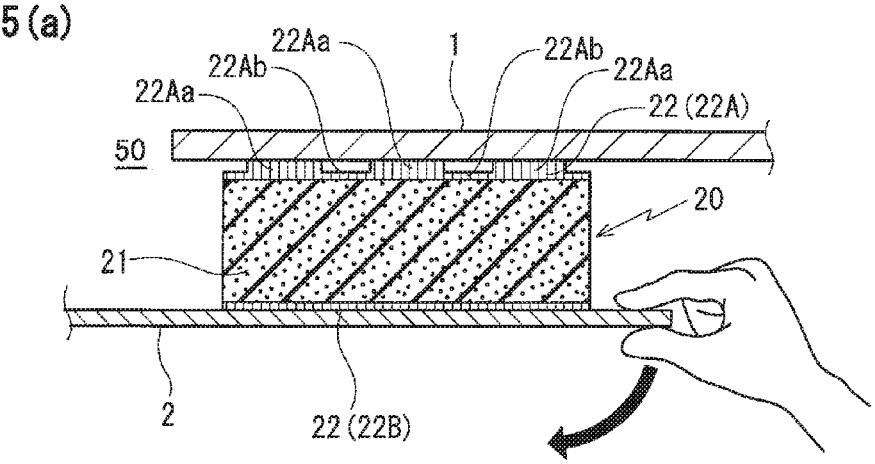
Figure 5B:
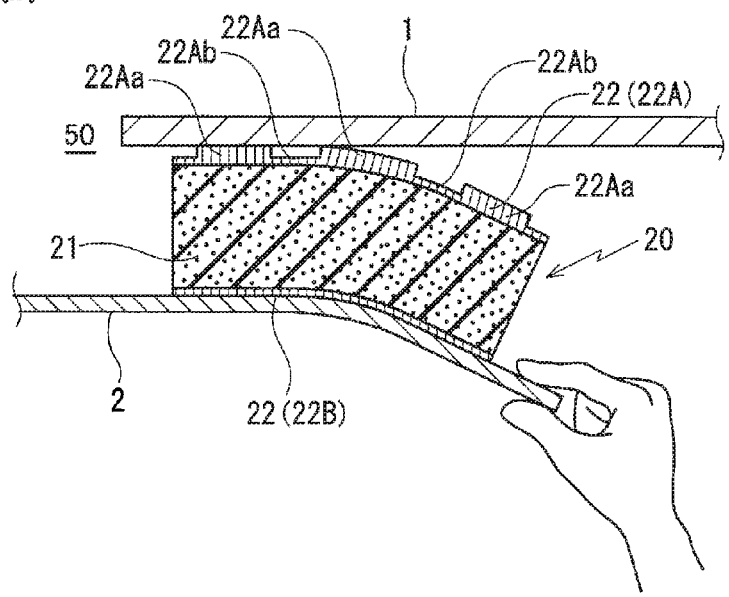

Referring to FIG. 4, FIG. 5 and FIG. 14, a sealing member 20 for water cutoff of a second embodiment of the present invention will be described. When constituents or items correspond to those in the first embodiment, the same symbols are used and explanations on the same constituents or items are omitted.

A body part 21 of the sealing member 20 for water cutoff of the second embodiment is substantially rectangular in cross section and is extrusion molded. The body part 21 has adhesive layers 22 (22A, 22B) formed on one surface (upper surface) and another surface (lower surface) as long sides thereof. The sealing member 20 for water cutoff of the second embodiment differs from the sealing member 20 for water cutoff of the first embodiment in that the adhesive layer 22A on the upper surface to be pasted on a side of a door inner panel 1 and the adhesive layer 22B on the lower surface to be pasted on a side of a door hole seal 2 have difference in adhesiveness.

A method of forming the adhesive layers 22 on the body part 21 is not limited. In the present embodiment, the adhesive layers 22 are formed by: molding a rope-like body part 21 by extrusion and vulcanization; dipping the rope-like body part 21 into an adhesive tank (not shown) filled with liquid adhesive for forming the adhesive layer 22 on a whole circumference of the body part 21 as shown in FIG. 2; passing the body part 21 through a die for scraping (not shown) for removing the adhesive layers 22 on left and right side surfaces of the body part 21; air drying the adhesive layers 22 remaining on the body part 21; and adjusting coating thickness and adhesion area of the adhesive layers 22 (22A, 22B) formed on the upper surface and the lower surface of the body part 21. The coating thickness and the adhesion area of the adhesive layers 22 (22A, 22B) are adjusted freely and simply by forming channels on a cope and a drag of the die for scraping (not shown). Release paper protects the upper surface and the lower surface of the body part 21 having the adhesive layers 22 (22A, 22B) formed thereon. The adhesive layers 22 on left and right side surfaces of the body part 21 may be left without being removed.

As shown in FIG. 4(a) and FIG. 4(b), the body part 21 of the sealing member 20 for water cutoff of the second embodiment is substantially rectangular in cross section and has a width of 6.0 mm and a thickness of 2.0 mm. The whole lower surface of the body part 21 has the adhesive layer 22B applied and formed thereon. The adhesive layer 22B has a film thickness 700 of 30 to 50 μm and is formed by a nozzle with a shape suitable for forming the adhesive layer 22B. The upper surface of the body part 21 has three convexes having a film thickness 300 of 50 to 100 μm and a width of 1.2 mm for forming thick parts 22Aa, and concaves having a film thickness 800 of 30 to 50 μm and a width of 0.8 mm for forming thin parts 22Ab between the convexes adjacent to each other.

Accordingly, the difference in the adhesiveness is secured by differentiating adhesion areas of the two adhesive layers 22A, 22B in a width direction. More specifically, the adhesiveness of the adhesive layer 22B on the lower surface to be pasted on the side of the door hole seal 2 is stronger than the adhesiveness of the adhesive layer 22A on the upper surface to be pasted on the side of the door inner panel 1. This is because the adhesive layer 22B as a whole (6.0 mm) on the lower surface touches and is pasted on the side of the door hole seal 2 whereas only the three convexes (3.6 mm=1.2 mm×3) on the upper surface touch and are pasted on the side of the door inner panel 1.

When peeling the door hole seal 2 with the sealing member 20 for water cutoff, which is joined to the door inner panel 1, as shown in FIG. 5, the sealing member 20 for water cutoff peels on the side of the door inner panel 1. This is because, by differentiating the adhesion areas of the adhesive layers 22A, 22B, the adhesiveness of the adhesive layer 22B on the lower surface to be pasted on the side of the door hole seal 2 is stronger than the adhesiveness of the adhesive layer 22A on the upper surface to be pasted on the side of the door inner panel 1.

When modifying positional shift which arises while pasting the sealing member 20 for water cutoff on the door inner panel 1, the door hole seal 2 with the sealing member 20 for water cutoff is always joined again on the side of the door inner panel 1. There are no remains of the sealing member 20 for water cutoff on the side of the door inner panel 1 and the door hole seal 2 reverts to a beginning condition before pasted on the door inner panel 1. Accordingly, modification of the positional shift is simple.

Now, results of 180° peel test on the sealing member 20 for water cutoff with a size shown in FIG. 4 will be shown. The body part 21 is made of a material (EPDM sponge rubber extruded and vulcanized) having a specific gravity of 0.21, a tensile fracture strength of 5 to 8 N and an elongation of 500%.

Figure 6:
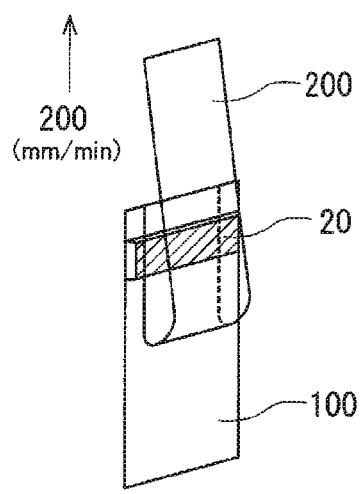
FIG. 6 is a rough perspective view of 180° peel test making use of the sealing member for water cutoff of the second and a third embodiments of the present invention.

As shown in FIG. 6, the 180° peel test comprises: pressure sticking a polyethylene (PE) sheet 200 having corona discharge treatment applied thereon and a sheet metal 100 corresponding to the door panel respectively on the lower surface and the upper surface of the sealing member 20 for water cutoff at a force of 2 kgf; preparing three units of the sealing member 20 for water cutoff, the polyethylene (PE) sheet 200 and the sheet metal 100; and, 24 hours later, releasing the polyethylene (PE) sheet 200 from the sheet metal 100 at a speed of 200 mm/minute in a direction of folding the polyethylene (PE) sheet 200 at an angle of 180° relative to the sheet metal 100. As a result, each of the sealing members 20 for water cutoff of the three units remained on the sides of the polyethylene (PE) sheet 200. Force required for releasing the polyethylene (PE) sheets 200 from the sheet metals 100 was 15 to 20 N/25 mm. In case the polyethylene (PE) sheet 200 and the sheet metal 100 were stuck on the sealing members 20 for water cutoff of which upper surfaces and lower surfaces were reversed, each of the sealing members 20 for water cutoff of the three units remained on the sides of the sheet metal 100. The sponge rubber as the material did not break off and was confirmed to be repetitively usable.

According to the sealing member 20 for water cutoff of the second embodiment, since the adhesive layer 22A on the upper surface to be pasted on the side of the door inner panel 1 and the adhesive layer 22B on the lower surface to be pasted on the side of the door hole seal 2 have difference in the adhesiveness, the door hole seal 2 with the sealing member 20 for water cutoff as a whole is tidily peeled off the door inner panel 1 as shown in FIG. 5. The structure remarkably improves operability of joining the door hole seal 2 again.

In the present embodiment, the adhesive layer 22A on the upper surface of the body part 21 comprises the plurality of convexes and concaves, which are the thick parts 22Aa and the thin parts 22Ab in coating thickness of the adhesive layer 22A, and only the thick parts 22Aa are pasted on the door inner panel 1 so that an adhesion area of the adhesive layer 22B on the lower surface of the body part 21 is larger than an adhesion area of the adhesive layer 22A on the upper surface of the body part 21. But the invention is not limited to the structure. Methods of differentiating the adhesiveness of the adhesive layers 22A, 22B and strengthening the adhesiveness of the adhesive layer 22B include: altering the adhesion areas or the coating thickness of the adhesive layers 22A, 22B; altering cross sectional shape of the body part 21; and combining not less than 2 of the methods.

Figure 7:
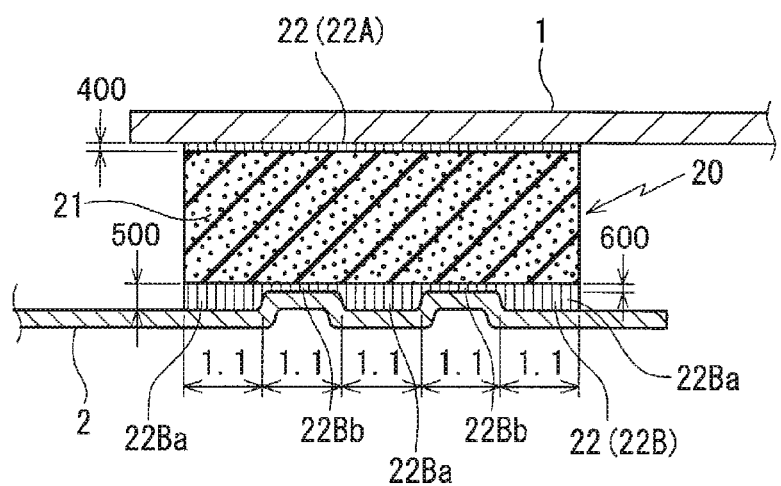
FIG. 7 is a I-I line enlarged cross section of FIG. 14, showing another sealing member for water cutoff of the second embodiment of the present invention.

The methods include an example shown in FIG. 7 in which the adhesive layer 22B on the lower surface of the body part 21 comprises the plurality of convexes and concaves for enlarging the adhesion area of the adhesive layer 22B on the lower surface of the body part 21 compared with the adhesion area of the adhesive layer 22A on the upper surface of the body part 21.

The whole upper surface of the body part 21 has the adhesive layer 22A having a film thickness 400 of 30 to 50 μm applied and formed thereon. The lower surface of the body part 21 has three convexes having a film thickness 500 of 100 to 130 μm and a width of 1.1 mm for forming thick parts 22Ba, and concaves having a film thickness 600 of 30 to 50 μm and a width of 1.1 mm for forming thin parts 22Bb between the convexes adjacent to each other. When subjected to pressure joining, the door hole seal 2 as well as the body part 21 are deformed so that the door hole seal 2 also adheres to the thin parts 22Bb as the concaves. As a result, the adhesion area of the adhesive layer 22B on the lower surface of the body part 21 is larger than the adhesion area of the adhesive layer 22A on the upper surface of the body part 21. Accordingly, adjusting intervals between the concaves and gluing the door hole seal 2 in accordance with the corrugated shape of the thick parts 22Ba and the thin parts 22Bb for the effect of softness of the body part 21 enlarges the adhesion area. In addition, forming the thick parts 22Ba of the adhesive layer 22B on the lower surface, which are thicker than the adhesive layer 22A also improves adhesive strength.

Three units of the resultant sealing member 20 for water cutoff, the polyethylene (PE) sheet 200 and the sheet metal 100 were subjected to 180° peel test shown in FIG. 6. As a result, each of the sealing members 20 for water cutoff of the three units remained on the sides of the polyethylene (PE) sheet 200.

Figure 8:
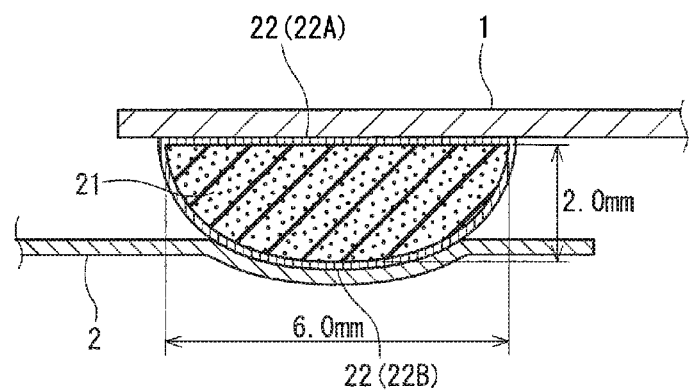
FIG. 8 is a I-I line enlarged cross section of FIG. 14, showing still another sealing member for water cutoff of the second embodiment of the present invention.

In addition, as shown in FIG. 8, the adhesion area of the adhesive layer 22B on the lower surface of the body part 21 can be larger than the adhesion area of the adhesive layer 22A on the upper surface of the body part 21 by: forming the body part 21 into a semicircular shape in cross section having a width of 6.0 mm and a thickness of 2.0 mm; forming the adhesive layer 22A having a film thickness of 20 to 30 μm on a linear part as the upper surface and forming the adhesive layer 22B having a film thickness of 40 to 80 μm on a curved part as the lower surface; and pressure sticking the door hole seal 2 on the curved part as the lower surface.

Three units of the resultant sealing member 20 for water cutoff, the polyethylene (PE) sheet 200 and the sheet metal 100 were subjected to 180° peel test shown in FIG. 6. As a result, each of the sealing members 20 for water cutoff of the three units remained on the sides of the polyethylene (PE) sheet 200.

Figure 9A:
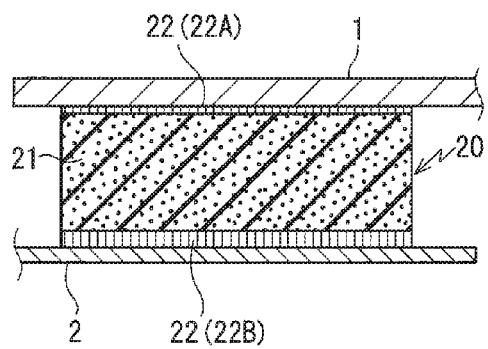
FIG. 9(a), FIG. 9(b) and FIG. 9(c) are I-I line enlarged cross sections of FIG. 14, showing still other sealing members for water cutoff of the second embodiment of the present invention.

In addition, as shown in FIG. 9(a), the adhesiveness on the side of the door hole seal 2 of the body part 21 which is substantially rectangular can be stronger by thickening the coating thickness of the adhesive layer 22B on the lower surface of the body part 21 compared with the coating thickness of the adhesive layer 22A on the upper surface of the body part 21, even in case adhesion areas of the adhesive layers 22A, 22B are the same in the width direction.

Figure 9B:
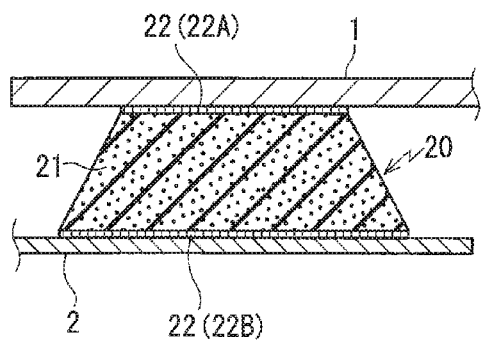

In addition, as shown in FIG. 9(b), the adhesiveness on the side of the door hole seal 2 can be stronger by forming the body part 21 into a trapezoidal shape in cross section for enlarging the adhesion area in the width direction of the adhesive layer 22B pasted on the side of the door hole seal 2 compared with the adhesion area in the width direction of the adhesive layer 22A pasted on the side of the door inner panel 1, even in case the coating thickness of the adhesive layers 22A, 22B are the same.

Figure 9C:
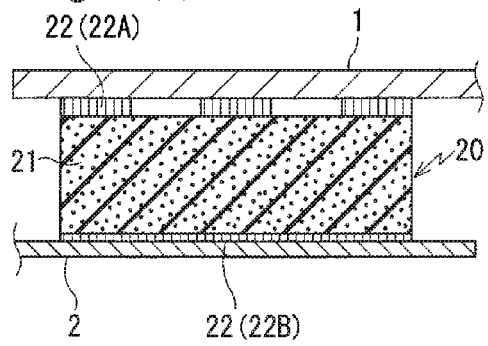

In addition, as shown in FIG. 9(c), adhesion area in the width direction of the adhesive layer 22B can be larger than the adhesion area in the width direction of the adhesive layer 22A by omitting formation of the adhesive layer 22A on some parts of the upper surface of the body part 21.

In the present embodiment, when the door hole seal 2 which is stuck and joined to the door inner panel 1 is peeled under a condition that the adhesiveness of the adhesive layer 22B is stronger than the adhesiveness of the adhesive layer 22A, the sealing member 20 for water cutoff peels on the side of the door inner panel 1. But, on the contrary, when the door hole seal 2 which is stuck and joined to the door inner panel 1 is peeled under a condition that the adhesiveness of the adhesive layer 22B is weaker than the adhesiveness of the adhesive layer 22A, the sealing member 20 for water cutoff peels on the side of the door hole seal 2.

(Third Embodiment)

Figure 10A:
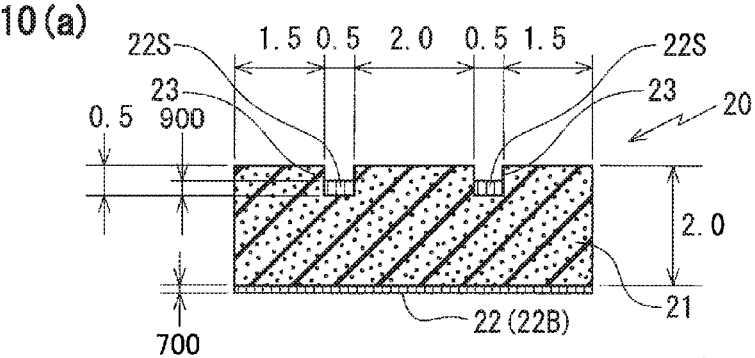
Figure 10B:
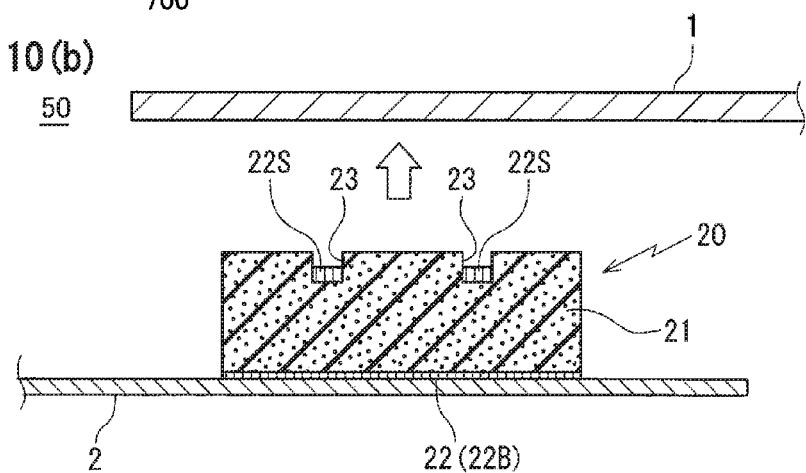
Figure 10C:
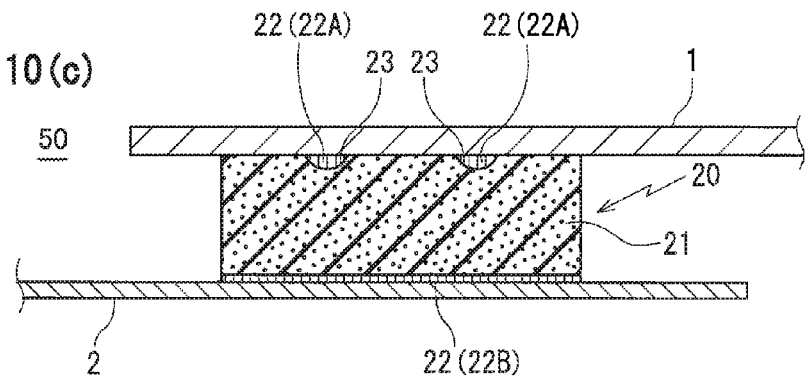
Figure 11A:
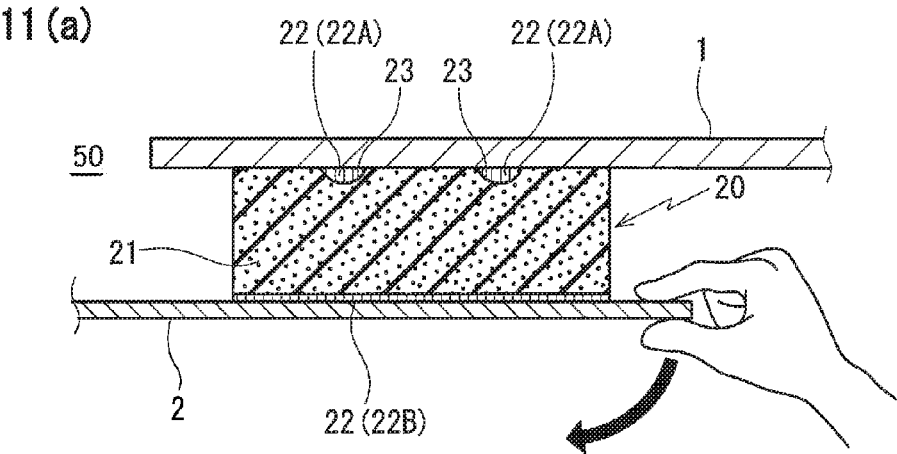
Figure 11B:
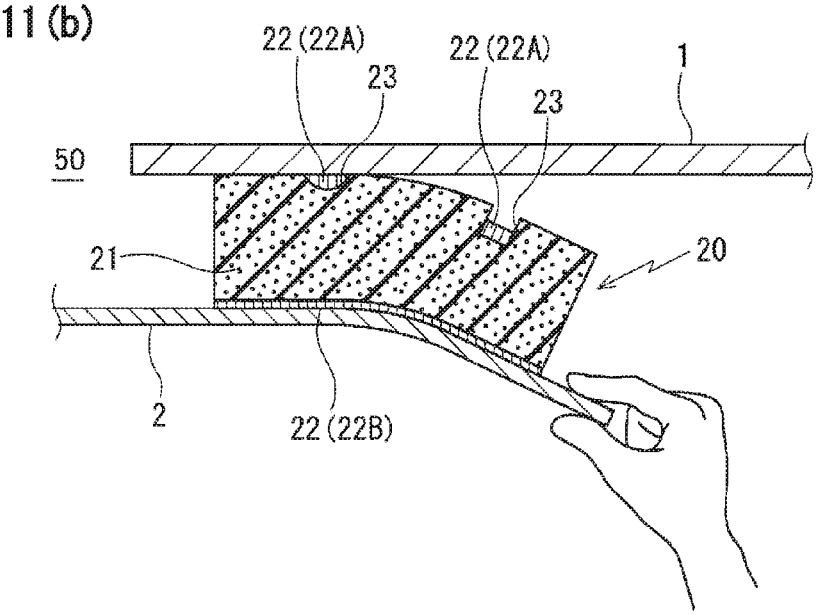

Referring to FIG. 10, FIG. 11 and FIG. 14, a sealing member 20 for water cutoff of a third embodiment of the present invention will be described. When constituents or items correspond to those in the first embodiment, the same symbols are used and explanations on the same constituents or items are omitted.

A body part 21 of a sealing member 20 for water cutoff of the third embodiment is substantially rectangular in cross section and is extrusion molded. The body part 21 has adhesive layers 22 (22A, 22B) formed on one surface (upper surface) and another surface (lower surface) as long sides thereof. The sealing member 20 for water cutoff of the third embodiment differs from the sealing member 20 for water cutoff of the first embodiment in that the upper surface as a long side has concaves 23 formed thereon and that the adhesive layer 22A on the upper surface to be pasted on a side of a door inner panel 1 and the adhesive layer 22B on the lower surface to be pasted on a side of a door hole seal 2 have difference in adhesiveness.

A method of forming the adhesive layers 22 on the body part 21 is not limited. In the present embodiment, the adhesive layers 22 are formed by: molding a rope-like body part 21 by extrusion and vulcanization; dipping the rope-like body part 21 into an adhesive tank (not shown) filled with liquid adhesive for forming the adhesive layer 22 on a whole circumference of the body part 21 as shown in FIG. 2; passing the body part 21 through a die for scraping (not shown) for removing the adhesive layers 22 on left and right side surfaces of the body part 21; air drying the remaining adhesive layers 22 on the body part 21; and adjusting coating thickness and adhesion area of the adhesive layers 22 (22A, 22B) formed on the upper surface and the lower surface of the body part 21. A plurality of (two in the present embodiment) concaves 23 are formed on a surface on the side of the door inner panel 1 of the body part 21 at a time of molding by extrusion and vulcanization. After pouring a certain amount of adhesive in the concaves, channels formed on the die for scraping adjust the amount of the adhesive in the concaves. Release paper protects the upper surface and the lower surface of the body part 21 having the adhesive layers 22 (22A, 22B) formed thereon. The adhesive layers 22 on left and right side surfaces of the body part 21 may be left without being removed.

As shown in FIG. 10(*a*) to FIG. 10(*c*), the body part 21 of the sealing member 20 for water cutoff of the third embodiment is substantially rectangular in cross section and has a width of 6.0 mm and a thickness of 2.0 mm. The two concaves 23 are formed on left and right sides of a fixed interval (2.0 mm) at a center of the upper surface of the body part 21.

The concaves 23 have a width and a depth of 0.5 mm and have adhesive 22S having film thickness (900) of 80 to 110 µm filled therein. The adhesive on the upper surface of the body part 21 other than the adhesive 22S inside the concaves 23 is scraped and is not left. The whole lower surface (lower surface as a whole) of the body part 21 has the adhesive layer 22B having a film thickness (700) of 30 to 50 µm formed thereon.

When sticking and joining the door hole seal 2 to the side of the door inner panel 1, the door hole seal 2 with the sealing member 20 for water cutoff is strongly pressed against the side of the door inner panel 1. As a result, the two concaves 23 on the body part 21 deform to be pushed open, the adhesive 22S inside the concaves 23 comes out and the adhesive 22S strongly adheres in part to the surface of the door inner panel 1.

The adhesiveness of the adhesive layer 22B on the lower surface to be pasted on the side of the door hole seal 2 can be stronger than the adhesiveness of the adhesive layer 22A on the upper surface to be pasted on the side of the door inner panel 1 by differentiating adhesion areas of the two adhesive layers 22A, 22B in the width direction. More specifically, by a structure shown in FIG. 10(*c*) that the adhesive layer 22B as a whole (6.0 mm) on the lower surface touches and is pasted on the side of the door hole seal 2 whereas the adhesive layer 22A partially touches and is pasted on the side of the door inner panel 1 only on two positions. The adhesive layer 22A of the third embodiment is the adhesive 22S pressed out by the deformation of the concaves 23 on the upper surface.

When peeling the door hole seal 2 with the sealing member 20 for water cutoff, which is joined to the door inner panel 1, as shown in FIG. 11, the sealing member 20 for water cutoff peels on the side of the door inner panel 1. This is because, by differentiating the adhesion areas of the adhesive layers 22A, 22B, the adhesiveness of the adhesive layer 22B on the lower surface to be pasted on the side of the door hole seal 2 is stronger than the adhesiveness of the adhesive layer 22A on the upper surface to be pasted on the side of the door inner panel 1.

When modifying positional shift which arises while pasting the sealing member 20 for water cutoff on the door inner panel 1, the door hole seal 2 with the sealing member 20 for water cutoff is always pasted again on the side of the door inner panel 1. There are no remains of the sealing member 20 for water cutoff on the side of the door inner panel 1, and the sealing member 20 for water cutoff reverts to a beginning condition before pasted on the door inner panel 1. Accordingly, modification of the positional shift is simple.

Now, results of 180° peel test on the sealing member 20 for water cutoff with a size shown in FIG. 10 will be described. The body part 21 is made of a material (EPDM sponge rubber extruded and vulcanized) having a specific gravity of 0.21, a tensile fracture strength of 6 to 8 N and an elongation of 500%.

As shown in FIG. 6, the 180° peel test comprises: pressure sticking a polyethylene (PE) sheet 200 having corona discharge treatment applied thereon and a sheet metal 100 corresponding to the door panel respectively on the lower surface and the upper surface of the sealing member 20 for water cutoff at a force of 2 kgf; preparing sample No. 1 in which the adhesive 22S having film thickness 900 of 80 to 110 µm is filled in the concaves 23 on the body part 21, sample No. 2 in which the adhesive 22S has the film thickness 900 of 150 to 170 µm and sample No. 3 in which the adhesive 22S has the film thickness 900 of 190 to 210 µm; and, and 24 hours after the pressure sticking, releasing the polyethylene (PE) sheet 200 from the sheet metal 100 at a speed of 200 mm/minute in a direction of folding the polyethylene (PE) sheet 200 at an angle of 180° relative to the sheet metal 100. As a result, force required for releasing the polyethylene (PE) sheets 200 from the sheet metals 100 of the three samples was as follows: the sample No. 1 required force of 10 to 15 N/25 mm, the sample No. 2 required force of 16 to 20 N/25 mm and the sample No. 3 required force of 19 to 23 N/25 mm Each of the sealing members 20 for water cutoff of the three samples (the sample No. 1, the sample No. 2 and the sample No. 3) remained on the sides of the polyethylene (PE) sheet 200. The sponge rubber as the material did not break off and was confirmed to be repetitively usable.

According to the sealing member 20 for water cutoff of the third embodiment, since the adhesiveness of the adhesive layer 22B on the lower surface to be pasted on the side of the door hole seal 2 is stronger than the adhesiveness of the adhesive layer 22A on the upper surface to be pasted on the side of the door inner panel 1, the door hole seal 2 with the sealing member 20 for water cutoff as a whole is tidily peeled off the door inner panel 1 as shown in FIG. 11. The structure remarkably improves operability of joining the door hole seal 2 again.

In addition, the plurality of concaves 23 on the surface on the side of the door inner panel 1 of the body part have the whole of the adhesive 22S for the side of the door inner panel 1 filled therein. When sticking and joining the door hole seal 2 to the side of the door inner panel 1, the plurality of concaves 23 deform to be pushed open. The adhesive 22S inside the concaves 23 comes to the surface of the body part, and the adhesive 22S partly adheres to the surface of the door inner panel 1 more strongly than other part around the concaves (other part on the surface of the door inner panel 1 around the concaves). Accordingly the amount of the adhesive 22S to be filled in the plurality of concaves can be simply adjusted by adjusting width and depth of the concaves 23 and, as a result, the adhesiveness of the sealing member 20 for water cutoff relative to the surface of the door inner panel 1 can be simply adjusted. In addition, the adhesiveness can be adjusted by number of the concaves 23.

In the present embodiment, the two concaves 23 on the upper surface of the body part 21 has the adhesive 22S filled therein so that the door inner panel 1 partly adheres to the adhesive layer 22A which is formed when sticking and joining the door hole seal 2 to the side of the door inner panel 1 whereas the door whole seal 2 adheres to the adhesive layer 22B formed on the whole lower surface of the body part 21. The structure enlarges the adhesion area of the adhesive layer 22B formed on the lower surface of the body part 21 compared with the adhesion area of the adhesive layer 22A formed on the upper surface of the body part 21. But the invention is not limited to the structure. Methods of differentiating the adhesiveness of the adhesive layers 22A, 22B and strengthening the adhesiveness of the adhesive layer 22B include: altering the adhesion areas or the coating thickness of the adhesive layers 22A, 22B; altering cross sectional shape of the body part 21; and combining not less than 2 of the methods. The number of the concaves 23 to be formed may be one.

Figure 12A:
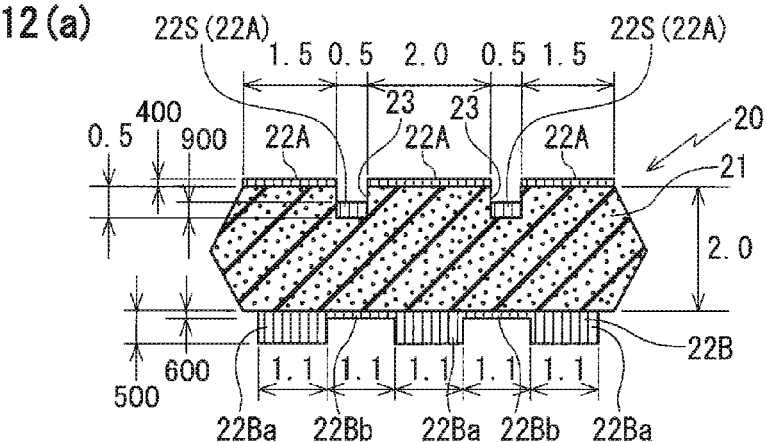
Figure 12B:
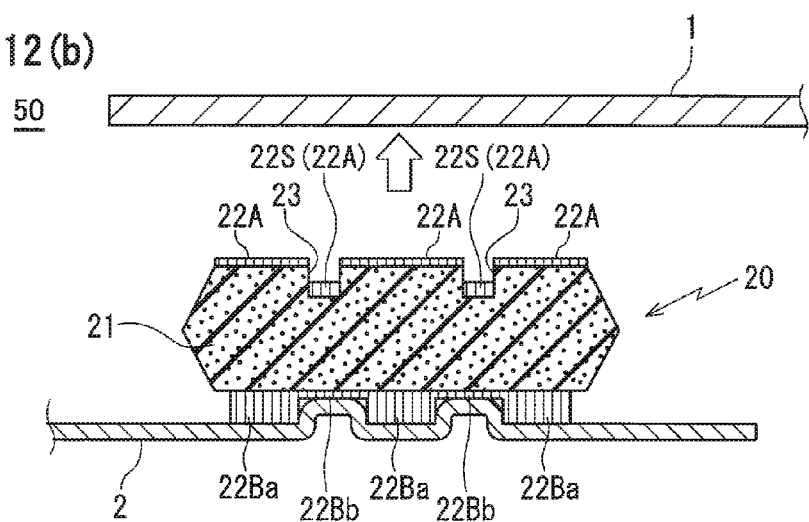
Figure 12C:
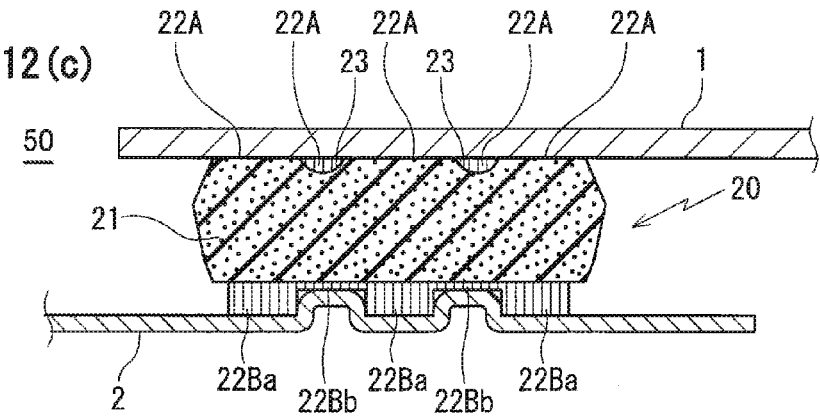

The methods include an example shown in FIG. 12(*a*) to FIG. 12(*c*), in which the adhesive layer 22B on the lower surface of the body part 21 comprises the plurality of convexes and concaves for enlarging the adhesion area of the adhesive layer 22B on the lower surface of the body part 21 compared with the adhesion area of the adhesive layer 22A on the upper surface of the body part 21.

The upper surface of the body part 21 has: the adhesive 22S having a film thickness 900 of 80 to 110 μm filled in the concaves 23; and the adhesive layer 22A having a film thickness 400 of not more than 10 μm applied and formed on the whole of flat parts thereof. The lower surface of the body part 21 has: three convexes having a film thickness 500 of 100 to 120 μm and a width of 1.1 mm for forming thick parts 22Ba; and concaves having a film thickness 600 of not more than 10 μm and a width of 1.1 mm for forming thin parts 22Bb between the convexes adjacent to each other. When subjected to pressure joining, the door hole seal 2 as well as the body part 21 are deformed so that the door hole seal 2 also adheres to thin parts 22Bb as the concaves. As a result, the adhesion area of the adhesive layer 22B on the lower surface of the body part 21 is larger than the adhesion area of the adhesive layer 22A on the upper surface of the body part 21. Accordingly, adjusting intervals between the concaves and gluing the door hole seal 2 in accordance with the corrugated shape of the thick parts 22Ba and the thin parts 22Bb for the effect of softness of the body part 21 enlarges the adhesion area. In addition, forming the thick parts 22Ba of the adhesive layer 22B on the lower surface, which are thicker than the adhesive layer 22A, also improves adhesive strength. In a different manner from the body part 21 of FIG. 1, which is substantially rectangular in cross section, the body part 21 of FIG. 12(*a*) to FIG. 12(*c*) comprises parts which are triangular in cross section and extending in left and right directions. Deformation degree of the parts which are triangular in cross section and extending in the left and right directions shows pressing force of the sealing member 20 for water cutoff relative to the door inner panel 1.

Three samples of the sealing members 20 for water cutoff (in the same manner as the sample No. 1, the sample No. 2 and the sample No. 3) were subjected to the 180° peel test shown in FIG. 6. As a result, each of the sealing members 20 for water cutoff of the three samples remained on the sides of the polyethylene (PE) sheet 200.

Figure 13:
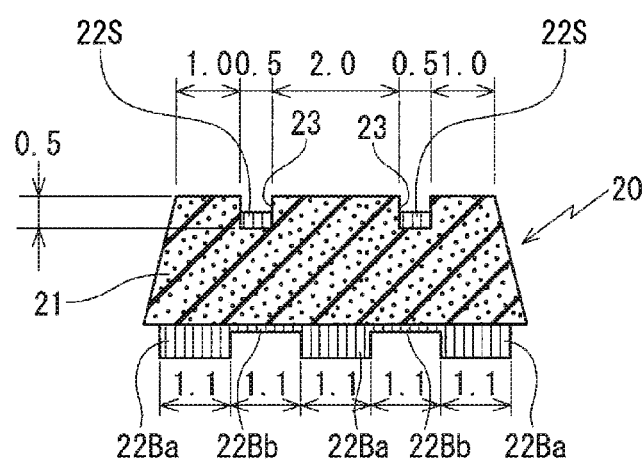
FIG. 13 is a I-I line enlarged cross section of FIG. 14, showing still another sealing member for water cutoff of the third embodiment of the present invention.

In addition, as shown in FIG. 13, the adhesiveness on the side of the door hole seal 2 can be stronger by forming the body part 21 into a trapezoidal shape in cross section. The structure further enlarges the adhesion area in the width direction of the adhesive layer 22B to be pasted on the side of the door hole seal 2 compared with the adhesion area in the width direction of the adhesive layer 22A to be pasted on the side of the door inner panel 1.

Three samples of the sealing members 20 for water cutoff (in the same manner as the sample No. 1, the sample No. 2 and the sample No. 3) were subjected to the 180° peel test shown in FIG. 6. As a result, each of the sealing members 20 for water cutoff of the three samples remained on the sides of the polyethylene (PE) sheet 200.

In the present embodiment, the adhesive layer 22A is not formed on the flat surface of the upper surface of the body part 21, but may be formed, as shown in FIG. 12, on the parts other than concaves 23. Also, the door hole seal 2 is curved into the corrugated shape in accordance with the thick parts 22Ba and the thin parts 22Bb in coating thickness provided by turns in the width direction on the lower surface of the body part 21 for the thin parts 22Bb as well as the thick parts 22Ba to be adhered. But, as shown in FIG. 10, the adhesive layer 22B having uniform width may be formed on the whole of the lower surface.

In the first to third embodiments of the present invention, the door hole seal 2 is joined to the door inner panel 1 by the sealing member 20 for water cutoff. But the sealing member 20 for water cutoff may be used: for joining noise insulation sheets other than the door hole seals 2; or for sticking and joining other automobile parts to panels or bodies of automobiles.

Also, the sealing member 20 for water cutoff is applicable to industrial material components (architecture, public engineering works) and other components unrelated to automobile parts. The sealing member 20 for water cutoff is usable for installing or joining two parts such as outer walls and iron framework units of houses.

We claim:

1. A sealing member for water cutoff for coupling to a panel or a body of an automobile for joining a member to the panel or the body of the automobile, the sealing member for water cutoff having a length and at least a part of the sealing member for water cutoff being curved when used, wherein the sealing member for water cutoff comprises a body part and adhesive layers, the body part comprising rubber which is extruded and vulcanized, the body part having a softness and elastic restoring force for reverting to an original shape when an external force once applied is removed, and the adhesive layers being formed by applying adhesive on surfaces of the body part, wherein one or a plurality of concave portions on a surface on a side of the panel or the body of the automobile of the body part has a whole or a part of adhesive for the side of the panel or the body of the automobile filled therein; when sticking and joining said member to the side of said panel or the body of the automobile, said one or the plurality of concave portions is pushed open and the adhesive inside contacts and adheres in part to a surface of the panel or the body of the automobile; substantially a whole surface on the side of said member has the adhesive for the side of said member applied thereon; and adhesiveness of said adhesive layer on the surface on the side of said member is stronger than adhesiveness of said adhesive layer on the surface on the side of the panel or the body of the automobile of said body part.

2. The sealing member for water cutoff as claimed in claim 1, wherein: said body part comprises a material having a specific gravity of 0.01 to 1.5, a tensile fracture strength of 0.5 to 30 N and an elongation of 150 to 1000%.

3. The sealing member for water cutoff as claimed in claim 2, wherein: said body part comprises a sponge body.

4. The sealing member for water cutoff as claimed in claim 1, wherein: said body part comprises a material having a specific gravity of 0.1 to 0.3, a tensile fracture strength of 3 to 10 N and an elongation of 200 to 800%.

5. The sealing member for water cutoff as claimed in claim 4, wherein: said body part of comprises a sponge body.

6. The sealing member for water cutoff as claimed in claim 1, wherein: said adhesive layer on the surface on a side of the member of said body part and said adhesive layer on the surface on a side of the panel or the body for the automobile of said body part have different adhesiveness.

7. The sealing member for water cutoff as claimed in claim 6, wherein: said body part comprises a material having a specific gravity of 0.01 to 1.5, a tensile fracture strength of 0.5 to 30 N and an elongation of 150 to 1000%.

8. The sealing member for water cutoff as claimed in Claim 7, wherein: said body part comprises a sponge body.

9. The sealing member for water cutoff as claimed in claim 6, wherein: said body part comprises a material having a specific gravity of 0.1 to 0.3, a tensile fracture strength of 3 to 10 N and an elongation of 200 to 800%.

10. The sealing member for water cutoff as claimed in claim 9, wherein: said body part comprises a sponge body.

11. The sealing member for water cutoff as claimed in Claim 1, wherein: said member is a sheet; the adhesive layer on the surface on the side of said sheet of said body part comprises a first part and a second part, the first part of the adhesive layer having a thickness of adhesive which is greater than a thickness of the second part of the adhesive layer; and said sheet is curved into a corrugated shape in accordance with the first part and the second part of the adhesive layer for said second part as well as said first part to be adhered to the sheet.

12. The sealing member for water cutoff as claimed in claim 11, wherein: said body part comprises a material having a specific gravity of 0.01 to 1.5, a tensile fracture strength of 0.5 to 30 N and an elongation of 150 to 1000%.

13. The sealing member for water cutoff as claimed in claim 11, wherein: said body part comprises a material having a specific gravity of 0.1 to 0.3, a tensile fracture strength of 3 to 10 N and an elongation of 200 to 800%.

14. The sealing member for water cutoff as claimed in claim 13, wherein: said body part comprises a sponge body.

15. The sealing member for water cutoff as claimed in claim 1, wherein: said body part comprises a sponge body.

* * * * *